United States Patent

Townson et al.

(10) Patent No.: US 7,850,219 B2
(45) Date of Patent: Dec. 14, 2010

(54) VISCOUS ROTARY DAMPER FOR VEHICLE END GATE ASSEMBLY

(75) Inventors: James M. Townson, Clarkston, MI (US); Graham S. Foulkes, Washington Township, MI (US); Eduardo S. Atar, Rochester Hills, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 70 days.

(21) Appl. No.: 12/247,342

(22) Filed: Oct. 8, 2008

(65) Prior Publication Data

US 2010/0084885 A1 Apr. 8, 2010

(51) Int. Cl.
*B60P 1/367* (2006.01)

(52) U.S. Cl. ........................................ 296/50; 296/57.1

(58) Field of Classification Search .................. 296/50, 296/57.1, 61, 1.01; 239/687; 211/59.2; 415/111, 415/112, 200
See application file for complete search history.

(56) References Cited

U.S. PATENT DOCUMENTS

| | | | | |
|---|---|---|---|---|
| 3,952,365 A | * | 4/1976 | Grisebach | 16/52 |
| 4,215,449 A | * | 8/1980 | Loikitz | 16/50 |
| D271,745 S | * | 12/1983 | Omata | D8/400 |
| 4,550,470 A | * | 11/1985 | Omata | 16/85 |
| 4,756,051 A | * | 7/1988 | Shy | 16/50 |
| 4,768,630 A | * | 9/1988 | Aubry et al. | 188/290 |
| 4,893,522 A | * | 1/1990 | Arakawa | 464/180 |
| 5,090,521 A | * | 2/1992 | Miura | 188/82.1 |
| 5,109,571 A | * | 5/1992 | Ohshima et al. | 16/307 |
| 5,269,397 A | * | 12/1993 | Kawamoto et al. | 188/290 |
| 5,358,301 A | * | 10/1994 | Konchan et al. | 296/146.1 |
| 5,635,655 A | * | 6/1997 | Yamashita | 84/179 |
| 5,720,370 A | * | 2/1998 | Takahashi | 188/310 |
| 5,887,930 A | * | 3/1999 | Klein | 296/37.12 |
| 5,988,724 A | * | 11/1999 | Wolda | 296/57.1 |
| 6,131,242 A | * | 10/2000 | Zipperle et al. | 16/82 |
| 6,213,533 B1 | * | 4/2001 | Widulle et al. | 296/37.12 |
| 6,357,813 B1 | * | 3/2002 | Vandeberghe et al. | 296/57.1 |
| 6,662,683 B1 | * | 12/2003 | Takahashi et al. | 464/180 |
| 6,725,503 B1 | * | 4/2004 | Lin | 16/76 |
| 6,769,729 B1 | * | 8/2004 | Bruford et al. | 296/50 |
| 6,773,047 B2 | * | 8/2004 | Gruber | 296/57.1 |
| 6,793,263 B1 | * | 9/2004 | Bruford et al. | 296/50 |
| 6,846,030 B2 | * | 1/2005 | Koehler et al. | 296/50 |
| 6,866,588 B2 | * | 3/2005 | Doornbos | 464/40 |
| 6,874,837 B2 | * | 4/2005 | Bruford et al. | 296/50 |
| 6,904,642 B2 | * | 6/2005 | West | 16/50 |
| 7,065,829 B2 | * | 6/2006 | Okabayashi et al. | 16/51 |

(Continued)

*Primary Examiner*—Kiran B. Patel
(74) *Attorney, Agent, or Firm*—Quinn Law Group, PLLC

(57) ABSTRACT

A viscous rotary damping device for a vehicle end gate assembly is provided. The damping device includes a housing member configured to operatively attach to the vehicle body or the end gate assembly. The housing member defines a fluid chamber having viscous fluid therein. The damping device also includes an impeller member having a mast with a first end configured to operatively attach to the other of the vehicle body and the end gate assembly, and a second end having one or more blades projecting outward therefrom. The second end of the mast is rotatably received in the fluid chamber such that the impeller member dissipates kinetic energy generated by the end gate assembly when transitioning between a first, closed position and a second, open position. A cover plate member is preferably coupled to the housing member, and configured to fluidly seal the fluid chamber.

13 Claims, 2 Drawing Sheets

U.S. PATENT DOCUMENTS

| | | | |
|---|---|---|---|
| 7,066,308 B2 * | 6/2006 | Kanno et al. | 188/290 |
| 7,204,353 B2 * | 4/2007 | Kanno et al. | 188/290 |
| 7,243,398 B2 * | 7/2007 | Salice | 16/341 |
| 7,281,747 B2 * | 10/2007 | Austin | 296/50 |
| 7,287,799 B2 * | 10/2007 | Austin | 296/57.1 |
| 7,350,629 B2 * | 4/2008 | Anton et al. | 188/82.1 |
| 7,353,923 B2 * | 4/2008 | Seto et al. | 188/290 |
| 7,500,706 B2 * | 3/2009 | Anderson et al. | 296/57.1 |
| 7,575,109 B2 * | 8/2009 | Kanno et al. | 188/296 |
| 7,673,929 B2 * | 3/2010 | Patzer et al. | 296/146.11 |
| 7,695,043 B2 * | 4/2010 | Zagoroff | 296/57.1 |
| 7,699,378 B2 * | 4/2010 | Smith et al. | 296/57.1 |
| 2006/0076782 A1 * | 4/2006 | Yeh et al. | 290/55 |
| 2006/0202500 A1 | 9/2006 | Eschebach et al. | |
| 2006/0249343 A1 * | 11/2006 | Prottengeier et al. | 188/381 |
| 2007/0152471 A1 * | 7/2007 | Zagoroff | 296/146.4 |
| 2008/0046153 A1 * | 2/2008 | Oualkadi et al. | 701/49 |
| 2009/0064461 A1 * | 3/2009 | Yin et al. | 16/330 |
| 2009/0064462 A1 * | 3/2009 | Yin et al. | 16/330 |
| 2009/0184533 A1 * | 7/2009 | Townson et al. | 296/57.1 |
| 2009/0302630 A1 * | 12/2009 | Duffy et al. | 296/57.1 |
| 2010/0084885 A1 * | 4/2010 | Townson et al. | 296/57.1 |

* cited by examiner

VISCOUS ROTARY DAMPER FOR VEHICLE END GATE ASSEMBLY

TECHNICAL FIELD

The present invention relates generally to vehicle end gate assemblies, and more specifically to devices for damping kinetic energy generated by movement of such end gate assemblies.

BACKGROUND OF THE INVENTION

Many conventional motor vehicles, such as the modern day pickup truck, are equipped with a pivotable end gate that closes off the end of a rear storage area. The traditional end gate (more commonly known as a "tailgate") is a door assembly extending transversely across the width of a rear portion of the vehicle. The end gate is normally hinged to the vehicle body at opposing side edges, near the bottom of the door assembly. The end gate is often mounted to two rear pillars between body side-panels that cooperatively form a vehicle storage area, such as the bed or box of a pickup truck or the rear cargo compartment of a sport utility vehicle (SUV). The end gate is operable to be unlatched, and swung from a vertical, closed position to a horizontal, open position that is approximately coplanar with an interior floor surface of the vehicle storage area.

Removal of the end gate may be desired to provide access to the bed without interference from the end gate, to attach loading ramps directly to the floor of the bed, or for other purposes for which flexibility of the bed and access to the bed is beneficial. On some vehicles, one or more cables are employed to provide additional support for the end gate when it is in the open position. The cables may have spring clips at one end that clip to a hook on a vehicle sidewall. Thus, the cables are unclipped from the hooks to release the cables from the sidewall, prior to lifting the end gate to remove the end gate from the vehicle.

Some end gate assemblies include a counterbalancing hinge assembly for assisting movement of the tailgate during opening and closing thereof. Different hinges can be used to produce various desired hinging characteristics. Torque (or torsion) rods have been used within prior art hinge devices to aid in hinging the end gate to the vehicle body. Deflection of the torque rod is used to counterbalance the weight of the end gate to aid in the opening and closing thereof. Specifically, the torque rod reduces the effort required to raise and lower the tailgate by storing energy in the twisting of the torque rod during opening/lowering from the residual kinetic energy generated by the tailgate. Although torque rod based tailgate counterbalancing hinge designs, such as those discussed above, reduce efforts in opening and closing the tailgate, the end gate can cause an objectionable impact and noise if allowed to free fall into the open position.

Some modern pickups and SUVs are also equipped with a damper on either side of the end gate to provide damped lowering of the end gate upon opening. In conventional end gate dampers, a pneumatic cylinder-and-piston assembly is coupled at one end to an upper portion of the end gate, and the other end to the vehicle body. When the tailgate is unlatched, the piston, under the weight of the end gate, compresses entrained air inside of the cylinder. The air is evacuated through a reduced-size orifice in the cylinder, creating a linear counterforce which acts to dissipate kinetic energy and thereby slow movement of the end gate.

SUMMARY OF THE INVENTION

According to one embodiment of the present invention, a damping device for an end gate assembly is provided. The end gate assembly is mounted to the body of a vehicle to pivot between a first position and a second position. The damping device includes a housing member configured to attach to the vehicle body or the end gate assembly. The housing member defines a fluid chamber having viscous fluid therein. The damping device also includes an impeller member having a mast with a first end configured to attach to the other of the vehicle body and the end gate assembly. A second end of the mast has one or more blades projecting outward therefrom. The second end of the mast is rotatably received in the fluid chamber such that the impeller member dissipates kinetic energy generated by the end gate assembly when transitioning between the first and second positions, thereby slowing movement of the end gate. Ideally, the impeller member and the end gate assembly rotate about a common axis.

According to one aspect of this particular embodiment, the kinetic energy dissipation characteristics of the impeller member increases as the end gate assembly transitions from the first position to the second position, and decreases as the end gate assembly transitions from the second position to the first position.

In accordance with another aspect of this embodiment, the fluid chamber includes first and second separate compartments. To this regard, the impeller member includes first and second blades respectively disposed in the first and second compartments. In this instance, the housing member preferably includes first and second partition walls that are configured to fluidly separate the first compartment from the second compartment. However, the damping device may further include one or more check valves that selectively fluidly connect the first compartment with the second compartment.

According to another aspect, the fluid chamber has an outer wall with a radius that varies with respect to the axis of rotation of the impeller member. Put another way, the eccentric clearance between the impeller member and side wall of the fluid chamber changes, creating different degrees of kinetic energy dissipation.

As part of another aspect of the present embodiment, the damping device also includes a cover plate member coupled to the housing member. The cover plate member is configured to fluidly seal the fluid chamber. Preferably, the cover plate member defines a central hole for passage of the mast of the impeller member. In this instance, the cover plate member also defines first and second annular grooves that are concentric with the central hole, and each configured to receive a respective annular seal member.

In accordance with yet another aspect, the first end of the impeller member is a trunnion post configured to be releasably received by a trunnion cup secured to or formed in the end gate assembly. In effect, the damping device replaces one of the prior art body-side trunnion post assemblies, but offers the damping characteristics described above while maintaining removability of the end gate assembly.

According to an additional aspect, each blade is connected to the mast such that the kinetic energy dissipation characteristics of the impeller member are greater when the end gate assembly transitions from the first position to the second position than when transitioning from the second position to the first position. Ideally, each blade is hinged (e.g., via a mechanical or a "live" hinge) to the second end of the mast.

The hinged engagement allows the blade to extend radially outward from the mast when the end gate assembly transitions from the first position to the second position, but lies generally flush against the mast when the end gate assembly transitions from the second position to the first position.

According to another embodiment of the present invention, a damping device for an end gate assembly is presented. The end gate assembly is pivotably mounted to the rearward portion of a vehicle body to transition from a closed position to an open position. The damping device includes a housing member configured to positively attach to the vehicle body. The housing member defines a generally circular fluid chamber therein. The fluid chamber has first and second compartment halves each with viscous fluid therein. The damping device also includes an impeller member having a mast with first and second opposing ends. The first end is configured to mate with the end gate assembly. The second end has first and second blades projecting radially outward therefrom. The first and second blades are respectively rotatably received inside the first and second compartment halves whereby the impeller member dissipates kinetic energy generated by the end gate assembly when transitioning between the closed and open positions. The level of dissipation increases as the end gate assembly transitions from the closed position to the open position, but decreases as the end gate assembly transitions from the open position to the closed position.

In accordance with yet another embodiment of the present invention, a motorized vehicle is provided. The vehicle has a vehicle body with a storage area at one end thereof. The storage area includes a floor portion with first and second side-body structures (e.g., side pillars or panels) respectively positioned on opposing sides thereof. The vehicle also includes an end gate assembly pivotably mounted to the vehicle body to transition between a closed position, in which the end gate assembly is generally perpendicular to the storage area floor portion, and an open position, in which the end gate assembly is generally coplanar to the storage area floor portion.

A housing member is positively attached to one of the vehicle side-body structures. The housing member defines a generally circular fluid chamber therein. The fluid chamber has first and second opposing compartment halves each with viscous fluid therein. The vehicle also includes an impeller member having an elongated mast with first and second opposing ends. The first end supportably mates with the end gate assembly, whereas the second end has first and second blades projecting radially outward therefrom. The first and second impeller blades are respectively rotatably received inside the first and second compartment halves of the fluid chamber. Accordingly, rotation of the impeller member through the viscous fluid in the fluid chamber dissipates kinetic energy generated by the end gate assembly when transitioning between the closed and open positions. The level of dissipation offered by the impeller member increases as the end gate assembly transitions from the closed position to the open position, but decreases as the end gate assembly transitions from the open position to the closed position.

According to one aspect of this embodiment, the impeller member and end gate assembly rotate about a common axis (i.e., the hinging centerline of the end gate pivot axis), which extends transversely across the vehicle body adjacent the storage area.

According to another aspect, the first compartment half has a first outer wall with a first radius that varies with respect to the axis of rotation of the impeller member. Similarly, the second compartment half has a second outer wall with a second radius that varies with respect to the impeller member axis of rotation.

In accordance with yet another aspect of this particular embodiment, at least one side of the end gate assembly is pivotably hinged directly to the vehicle body (i.e., one of the side-body structures) via the impeller and housing members. However, it is preferred that the impeller member be configured such that the end gate assembly is detachable from the vehicle body without the use of tools.

As part of yet another aspect, the vehicle also includes a gate-side hinge strap which includes a first plate portion that extends generally orthogonally from a second plate portion. The first plate portion is secured to the end gate assembly, and the second plate portion includes a trunnion cup. Accordingly, the first end of the impeller member is a trunnion post configured to be releasably received by the trunnion cup.

The above features and advantages, and other features and advantages of the present invention, will be readily apparent from the following detailed description of the preferred embodiments and best modes for carrying out the invention when taken in connection with the accompanying drawings and appended claims.

DETAILED DESCRIPTION OF THE PREFERRED EMBODIMENTS

Figure 1:
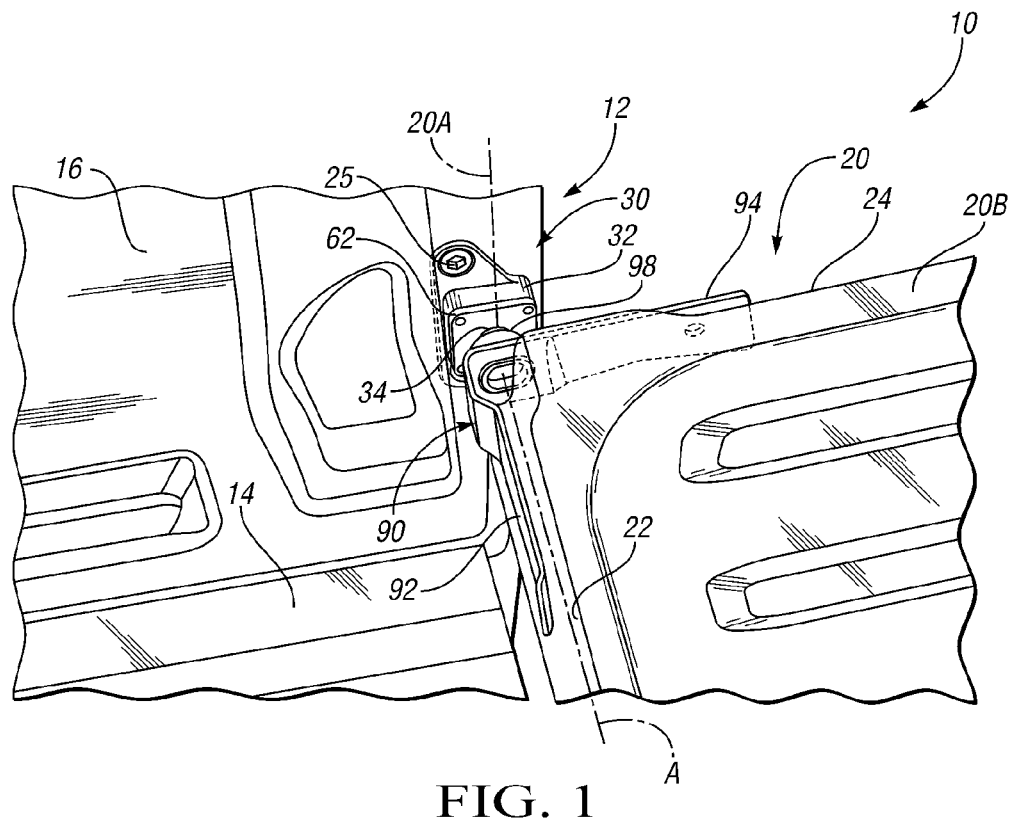
FIG. 1 is a perspective view illustration of a portion of an end gate assembly which is mounted to a vehicle body, in part, by a viscous rotary damper in accordance with a preferred embodiment of the present invention.

Referring to the drawings, wherein like reference numbers refer to like components throughout the several views, FIG. 1 illustrates a representative motorized vehicle, indicated generally at 10, with which the present invention may be incorporated and practiced. The present invention is described herein in the context of a standard pickup truck of conventional construction, offering a representative application by which the present invention may be utilized. However, the present invention is in no way limited to the particular vehicle configuration illustrated in FIG. 1. In addition, the drawings presented herein are not to scale, and are provided purely for instructional purposes. As such, the specific and relative dimensions shown in the drawings are not to be considered limiting.

Referring first to FIG. 1, the vehicle 10 includes a vehicle body that is represented herein by a bed portion 12 (also referred to in the art as "cargo bed" or "pickup box") that is rearward of a cab portion (not visible in the views provided). The bed portion 12 has a bed floor 14 with side-body structures, such as two sidewalls 16 (only one of which is visible in FIG. 1, but two of which are present), respectively positioned on opposing sides thereof. The vehicle 10 includes many conventional components, such as suspension, drive train, brake system, steering and body components that are well known in the art. Thus, these structures will not be illustrated or discussed in detail herein.

An end gate assembly, identified generally by reference numeral 20, is mounted at laterally opposing sides thereof to the sidewalls 16 of the vehicle body. In the exemplary embodiment of FIG. 1, the end gate assembly 20 is a drop-down, trunnion type tailgate, that is pivotable between a first, generally vertical, closed position (shown in phantom at 20A in FIG. 1), in which the end gate assembly 20 is generally perpendicular to the floor portion 14, and a second, generally horizontal, open position 20B, in which the end gate assembly 20 is generally coplanar to the floor portion 14. A latch mechanism, which may incorporate a locking device (neither of which are shown), is employed to selectively secure the tailgate assembly 20 in the closed position 20A, thereby forming an enclosure between the tailgate assembly 20, first and second sidewalls 16, and the cab portion. A rearward facing opening is created between the sidewalls 16 when the tailgate assembly 20 is displaced from its closed position 20A, rotated into the open position 20B to allow for ease of use in loading and unloading cargo, as would be readily understood by those in the art.

Figure 2:
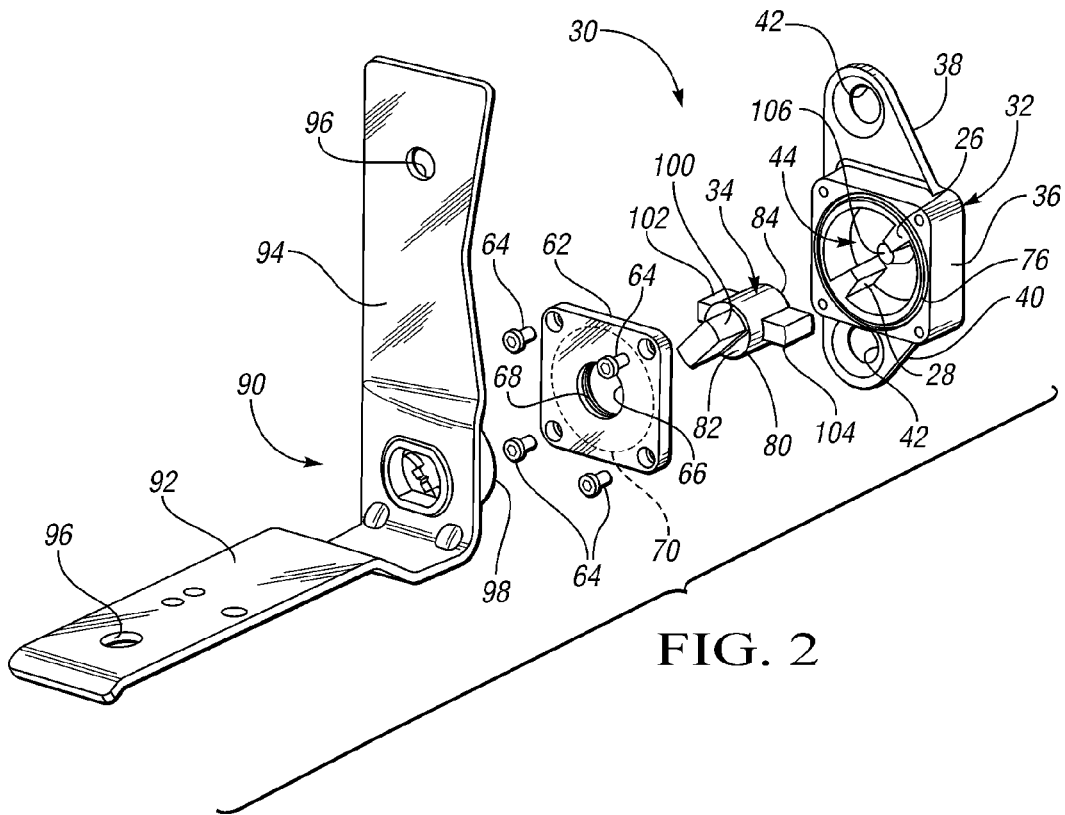
FIG. 2 is an exploded isometric illustration of the viscous rotary damper, gate-side hinge strap and trunnion cup of FIG. 1.

In accordance with the present invention, the vehicle 10 also includes at least one viscous rotary damper, indicated generally throughout the drawings at 30 and referred to hereinafter at times as "damping device". The viscous rotary damper 30 consists essentially of two primary constituent parts: a housing member (or "fluid container") 32 and an impeller member (or "arbor") 34. The housing member 32 is adapted to attach to either the end gate assembly 20 or the vehicle body, namely one of the side-body structures 16. According to the embodiment shown in FIGS. 1 and 2, the housing member 32 has a generally rectangular casing 36 with first and second integral, generally coplanar ears 38 and 40, respectively, that project outward from opposing sides thereof. Each of the ears 38, 40 has a respective fastener hole 42 that extends therethrough, and is shaped and dimensioned to receive a corresponding fastener, such as bolts 25 (one of which is visible in FIG. 1). It should be recognized that the number, configuration, and orientation of the ears 38, 40 and fastener holes 42 may be modified to accommodate the packaging and design constraints of a particular vehicle application. Moreover, the housing member 32 may be positively attached to the vehicle 10 by other means, such as welding, or may be integrally formed as a unitary structure therewith.

Figure 3A:
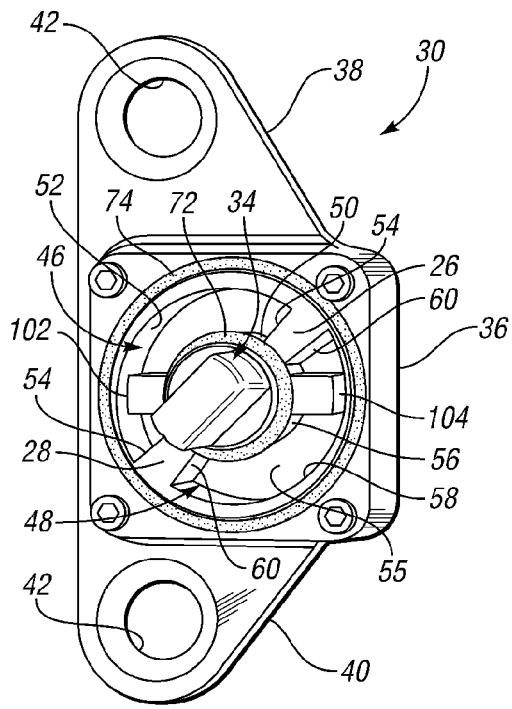
FIG. 3A is a perspective view illustration of the viscous rotary damper of FIGS. 1 and 2 with the housing cover plate removed to show a first eccentric clearance between the impeller blades and corresponding side walls of the fluid housing.
Figure 3B:
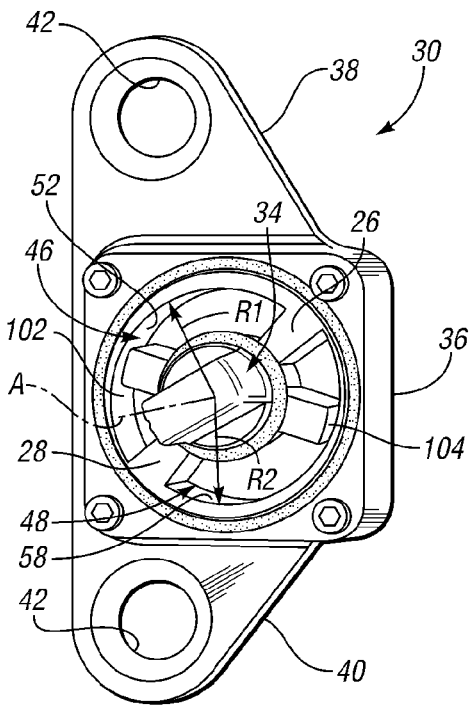
FIG. 3B is a perspective view illustration of the viscous rotary damper of FIGS. 1 and 2 with the housing cover plate removed to show a second eccentric clearance between the impeller blades and corresponding side walls of the fluid housing.
Figure 3C:
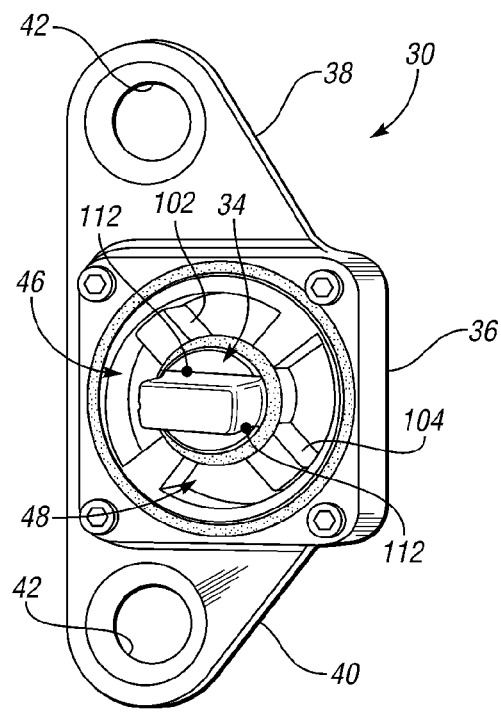
FIG. 3C is a perspective view illustration of the viscous rotary damper of FIGS. 1 and 2 with the housing cover plate removed to show a third eccentric clearance between the impeller blades and corresponding side walls of the fluid housing.
Figure 3D:
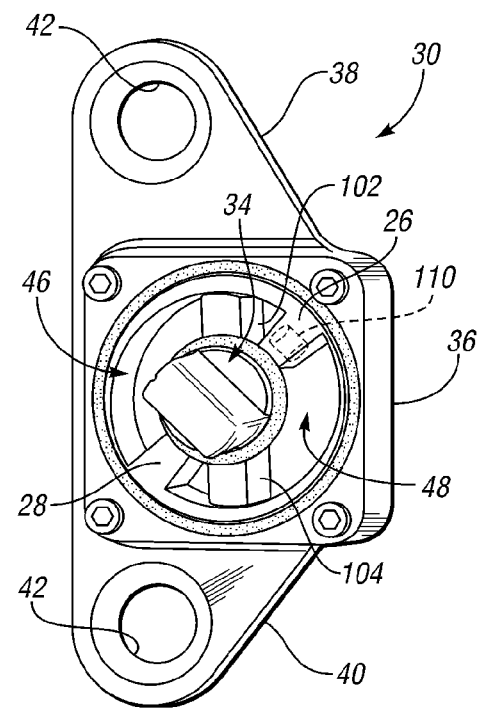
FIG. 3D is a perspective view illustration of the viscous rotary damper of FIGS. 1 and 2 with the housing cover plate removed to show a fourth eccentric clearance between the impeller blades and corresponding side walls of the fluid housing.

The casing portion 36 of the housing member 32 defines a generally circular fluid chamber 44 therein. As best seen in FIGS. 3A-3D, the fluid chamber 44 is split into two portions—i.e., first and second opposing compartment halves, indicated generally at 46 and 48, respectively, each with viscous fluid therein. The first compartment 46 has a generally half-moon shape with opposing arcuate inner and outer walls 50 and 52, respectively, that are connected by intermediate planar walls 54 that extend therebetween, as seen in FIG. 3A. Similarly, the second compartment 48 also has a generally half-moon shape with opposing arcuate inner and outer walls 56 and 58, respectively, that are connected by intermediate planar walls 60 that extend therebetween. The intermediate walls 54 and 60 cooperate to define, in part, first and second partition walls 26 and 28, respectively, that fluidly separate the first compartment half 46 from the second compartment 48.

The damping device 30 also includes a cover plate member 62. The cover plate member 62 couples or attaches to the housing member 32, for example, by an array of threaded fasteners 64. The cover plate member 62 operates to fluidly seal the fluid chamber 44. In the exemplary embodiment of FIG. 2, the cover plate member 62 defines a central hole 66 for passage of the impeller member 34. In order to seal the inner perimeter of the fluid chamber 44 around the impeller member 34, the cover plate member 62 has a first, inner annular groove 68 that is concentric with the central hole 66, and configured to receive a first elastomeric annular seal member 72 (FIG. 3A) which fits around the impeller member 34. In a similar regard, the cover plate member 62 also has a second, outer annular groove, shown hidden in FIG. 2 at 70, that circumscribes and is preferably concentric with the central hole 66 and inner annular groove 68. The outer annular groove 70 is configured to receive a second elastomeric annular seal member 74 (FIG. 3A) which is received in a complementary groove 76 (FIG. 2) formed in the casing 36 in order to seal the outer perimeter of the fluid chamber 44.

The end gate assembly 20 includes a gate-side hinge strap, indicated generally at 90. The gate-side hinge strap 90 includes a first, generally flat, plate portion 92 that extends generally orthogonally from a second, generally flat, plate portion 94. Each plate portion 92, 94 has a fastener hole 96 that extends therethrough. The fastener holes 96 are shaped and dimensioned to receive a corresponding fastener, such as bolts (not shown), that secure the gate-side hinge strap 90 to a bottom corner of the end gate assembly 20, as seen in FIG. 1. To be more precise, a bolt is passed through the hole 96 in the first plate portion 92, and threadably engaged with a complementary hole (not visible in the views provided) in a lower surface 22 of the end gate assembly 20. Similarly, a bolt is passed through the hole 96 in the second plate portion 94, and threadably engaged with a complementary hole (not visible) in a laterally outboard surface 24 of the end gate assembly 20.

The impeller member 34 is adapted to mate the viscous rotary damper 30 with the part of the vehicle 10 to which the housing member 32 is not attached. In other words, if the housing member 32 is bolted to the sidewall 16 of the pickup bed 12, as seen in FIG. 1, the impeller member 34 mates with the end gate assembly 20, and vise versa. In accordance with the embodiment of FIGS. 1 and 2, a trunnion cup 98 protrudes outward from a lower section of the gate-side hinge strap 90—i.e., second plate portion 94. The impeller member 34, on the other hand, has an elongated mast 80 with first and second opposing ends 82 and 84, respectively. An integral trunnion post 100 extends axially outward from the first end 82 of the impeller member 34 to be slidably and releasably received in a complementary slot (not shown) in the trunnion cup 98. For example, the end gate assembly 20 may be removed from the vehicle 10 by lifting the end gate 20 slightly upward, and sliding the end gate transversely away from sidewall 16 to allow the trunnion cup 98 to slide off of the trunnion post 100. Reattachment of the end gate assembly 20 merely requires reversing the steps for detachment. As such, the end gate assembly 20 is attachable to/detachable from the vehicle body without the use of tools. It should be understood that the trunnion cup 98 may be integrally formed or attached to the impeller member 34 and, correspondingly, the trunnion post 100 be integrally formed or attached to the gate-side hinge strap 90 without departing from the intended scope of the present invention.

At least one side of the end gate assembly 20 is pivotably hinged directly to the vehicle body (i.e., one of the side-body structures) via the damping device 30. However, both sides of the end gate assembly 20 can be supported by a respective damping device 30. In effect, each damping device 30 of the present invention operates to replace one of the prior art body-side trunnion post assemblies needed to attach the end gate assembly 20 to the vehicle body, while offering the damping characteristics described below and maintaining removability of the end gate assembly 20. The present invention can thus be offered as a Regular Production Option (RPO) supplement, or a Service Part Option (SPO) retrofit for trunnion assemblies already in service.

The second end 84 of the impeller mast 80 has at least one blade projecting outward therefrom. In accordance with preferred practice, first and second rectangular blades 102 and 104, respectively, project radially outward from the mast 80, on opposing sides thereof. However, fewer or more than two impeller blades, of similar or differing geometries and orientations, may be employed within the scope of the present invention. As seen throughout FIGS. 3A-3B, the second end 84 of the mast 80 is rotatably received in the fluid chamber 44. The impeller member 34 is radially aligned inside of the fluid chamber 44 by a protuberance 106 which projects outward from the center of base surface 55 (FIG. 3A) to engage with a complementary cavity in the mast 80. As seen in FIG. 1, the impeller member 34 and end gate assembly 20 rotate about a common axis A—i.e., the hinging centerline of the end gate pivot axis, which extends transversely across the vehicle body, adjacent the bed portion 12.

The impeller blades 102, 104 are rotatably received inside the first and second compartment halves 46, 48, respectively, and operate to dissipate kinetic energy generated by the end gate assembly 20 when it transitions between the closed 20A and open 20B positions. That is, as the end gate assembly 20 is moved from the vertical closed position 20A shown in FIG. 1, by an operator or otherwise, the impeller member 34 will be forced to rotate via the above described interconnection between the gate-side hinge strap 90 and damping device 30. This, in turn, will force the blades 102, 104 through the viscous fluid entrained in the fluid chamber 44. As the blades 102, 104 move, viscous fluid is forced from one side thereof, through a reduced cross-section along an outer peripheral edge thereof, to the other side of the blades 102, 104, which dissipates the kinetic energy as heat. Unlike any prior art tailgate dampers, the viscous rotary damper 30 of the current invention is an axial damper—i.e., all damping is applied directly to the axis of rotation of the end gate assembly 20. In addition, this invention enables added customer perceived quality by providing a controlled velocity opening experience of the end gate subsystem. Although tailored toward pickup truck tailgates, the same engineered solution could be adapted to any vehicle swinging door or compartment lid with a lateral pivot axis.

With continued reference to FIGS. 3A-3D, the level of dissipation offered by the impeller member 34 increases as the end gate assembly 20 transitions from the closed position 20A to the open position 20B, but decreases as the end gate assembly 20 transitions from the open position 20B to the closed position 20A. This feature is accomplished, for example, by varying the eccentric clearance between the impeller member 32 and outer sidewalls 52, 58 of the fluid chamber 44, creating different degrees of kinetic energy dissipation. That is, the first compartment half outer wall 52 has a first radius RI that varies with respect to the axis of rotation A of the impeller member 34. Similarly, the second compartment half outer wall 58 has a second radius R2 that varies with respect to the impeller member axis of rotation A. For example, as the end gate assembly rotates in a clockwise direction from the closed 20A to open position 20B, the gap between the impeller blades 102, 104 and outer walls 52, 58 reduces (compare FIGS. 3A-3B). Thus, more energy is required to force the viscous fluid from one side to the other. The flow of fluid is controlled and balanced against the increasing rotational speed of the end gate assembly 20 through the eccentric clearance between the impeller member 34 and sidewalls of the fluid chamber 44. The damping device 30 may further include one or more check valves (one of which is shown hidden in FIG. 3D at 110) that selectively fluidly connect the first compartment 46 with the second compartment 48.

Alternatively, each blade 102, 104 may be connected to the mast 80 such that the kinetic energy dissipation characteristics of the impeller member 34 are greater when the end gate assembly 20 transitions from the closed position 20A to the open position 20B than when transitioning from the open position 20B to the closed position 20A. For example, each blade may be hinged—e.g., via a mechanical or a "live" hinge, which are represented collectively in FIG. 3C at 112, to the second end 84 of the mast 80. The hinged engagement allows each blade 102, 104 to extend radially outward from the mast when the end gate assembly 20 transitions from closed to open, but lies generally flush against the mast 80 when the end gate assembly 20 transitions from the open position 20B to the closed position 20A.

While the best modes for carrying out the invention have been described in detail, those familiar with the art to which this invention relates will recognize various alternative designs and embodiments for practicing the invention within the scope of the appended claims.

The invention claimed is:

1. A damping device for an end gate assembly operatively mounted to a vehicle body to pivot between a first position and a second position, the damping device comprising:
   a housing member configured to operatively attach to one of the vehicle body and the end gate assembly, said housing member defining a fluid chamber having viscous fluid therein; and
   an impeller member having a mast with a first end configured to operatively attach to the other of the vehicle body and the end gate assembly, and a second end having at least one blade projecting outward therefrom;
   wherein said second end of said mast is rotatably received in said fluid chamber such that said impeller member dissipates kinetic energy generated by the end gate assembly when transitioning between the first and second positions.

2. The damping device of claim 1, wherein said impeller member and the end gate assembly rotate about a common axis.

3. The damping device of claim 1, wherein said impeller member increasingly dissipates kinetic energy as the end gate assembly transitions from the first position to the second position, and decreasingly dissipates kinetic energy as the end gate assembly transitions from the second position to the first position.

4. The damping device of claim 1, wherein said fluid chamber includes first and second compartments, and wherein said at least one blade includes first and second blades respectively disposed in said first and second compartments.

5. The damping device of claim 4, wherein said housing member includes first and second partition walls configured to fluidly separate said first compartment from said second compartment.

6. The damping device of claim 4, further comprising:
at least one check valve selectively fluidly connecting said first compartment with said second compartment.

7. The damping device of claim 1, further comprising:
a cover plate member coupled to said housing member and configured to fluidly seal said fluid chamber.

8. The damping device of claim 7, wherein said cover plate member defines a central hole for passage of said mast of said impeller member.

9. The damping device of claim 8, wherein said cover plate member defines first and second annular grooves concentric with said central hole and each configured to receive a respective one of first and second annular seal members.

10. The damping device of claim 1, wherein said first end of said impeller member is a trunnion post configured to be releasably received by a trunnion cup secured to the end gate assembly.

11. The damping device of claim 1, wherein said at least one blade is operatively connected to said mast such that kinetic energy dissipation characteristics of said impeller member are greater when the end gate assembly transitions from the first position to the second position than when the end gate assembly transitions from the second position to the first position.

12. The damping device of claim 11, wherein said at least one blade is hinged to said second end of said mast, whereby said at least one blade extends radially outward from said mast when the end gate assembly transitions from the first position to the second position, and whereby said at least one blade lies generally flush against said mast when the end gate assembly transitions from the second position to the first position.

13. The damping device of claim 1, wherein said fluid chamber has an outer wall with a radius that varies with respect to an axis of rotation of said impeller member.

* * * * *